United States Patent [19]
Jacobson et al.

[11] Patent Number: 5,785,003
[45] Date of Patent: Jul. 28, 1998

[54] PET CARRIER FOR VEHICLES

[76] Inventors: Harold Jacobson, 10783 White Aspen La., Boca Raton, Fla. 33428; Barry Semegram, 9017 Baybury La., West Palm Beach, Fla. 33411

[21] Appl. No.: 901,766

[22] Filed: Jul. 28, 1997

[51] Int. Cl.$^6$ ............................................. A01K 1/035
[52] U.S. Cl. .................. 119/496; 119/28.5; 119/498
[58] Field of Search ..................... 119/28.5, 453, 119/484, 496, 498, 499; 297/254, 255, 256.15, 256.16, 256.17

[56] References Cited

U.S. PATENT DOCUMENTS

| | | | |
|---|---|---|---|
| 1,261,951 | 4/1918 | MacGowan | 119/28.5 X |
| 1,351,746 | 9/1920 | Eberle | 119/28.5 X |
| 2,530,900 | 11/1950 | Nelson, Jr. | 297/254 |
| 3,144,273 | 8/1964 | P'Simer | 297/254 |
| 3,359,946 | 12/1967 | Schluttig | 119/498 X |
| 3,481,311 | 12/1969 | Schluttig | 119/498 X |
| 4,010,880 | 3/1977 | Guillot-Munoz | 119/496 X |
| 4,597,359 | 7/1986 | Moorman | 119/28.5 |
| 4,700,988 | 10/1987 | Meyers | 297/254 |

FOREIGN PATENT DOCUMENTS

89/08386  9/1989  European Pat. Off. ............... 119/496

*Primary Examiner*—Robert P. Swiatek
*Assistant Examiner*—Elizabeth Shaw
*Attorney, Agent, or Firm*—Robert M. Downey, P.A.

[57] ABSTRACT

A pet carrier for safely transporting pets in a vehicle includes a basket having a floor and surrounding containment walls and a support assembly for mounting the carrier to a passenger seat of the vehicle so that pets restrained within the basket can easily view the outer surroundings through the vehicle's windows. The support assembly includes a pair of rear arm members movably adjustable to assume a select one of several locked, operable positions with a hooked distal end zone of the arm members resting over the top of the seat back to maintain the basket forward of the seat back, and a removable forward leg support depending below the basket for engagement with the seat base to thereby maintain the basket floor generally horizontal and above the seat base. Collapsible handles permit hand carrying of the carrier and pets therein when the carrier is removed from the vehicle and an adjustable strap in the basket attaches to the pet to restrain the pet within the carrier.

7 Claims, 3 Drawing Sheets

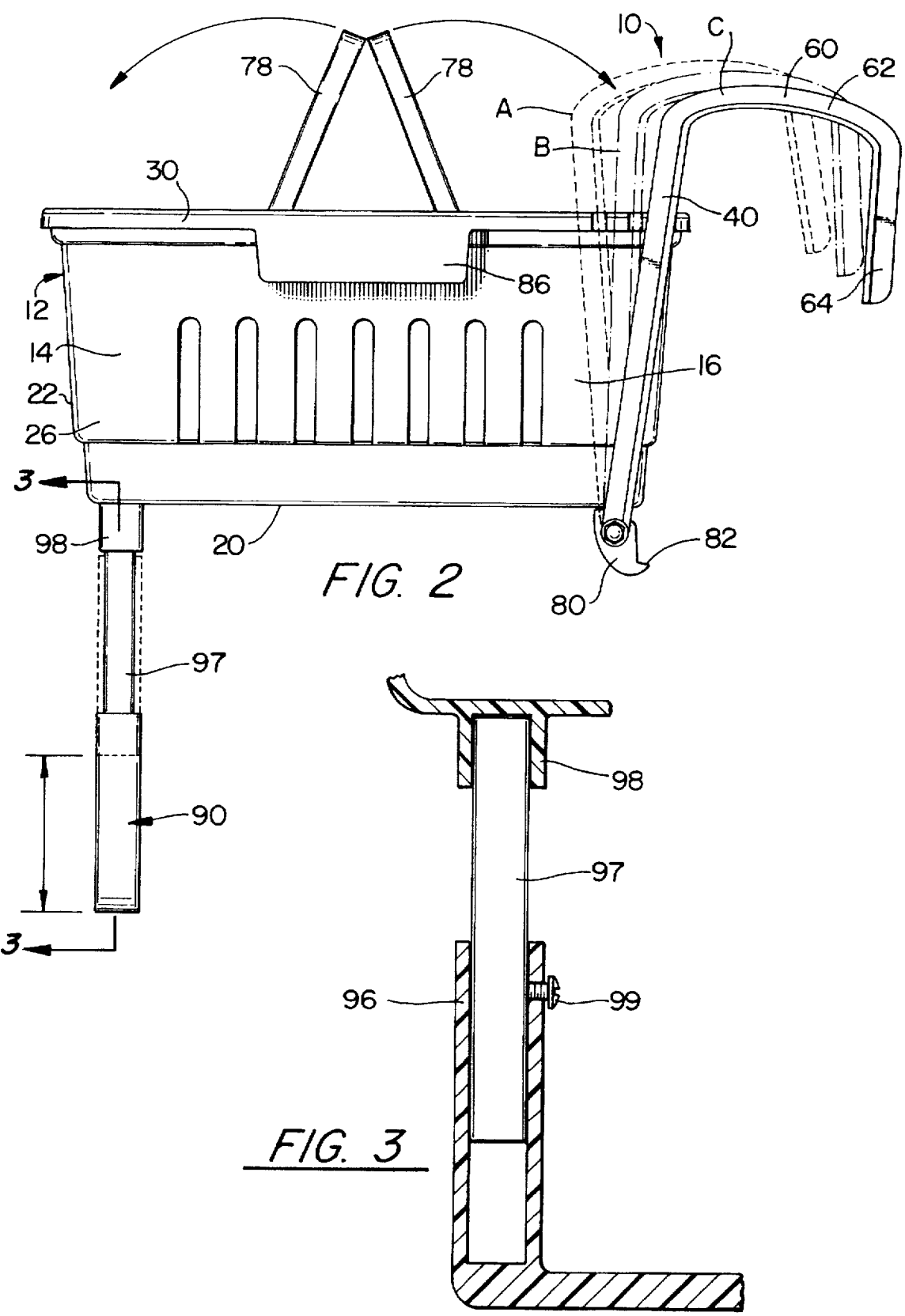

PET CARRIER FOR VEHICLES

BACKGROUND OF THE INVENTION

1. Field of the Invention

The present invention relates to a pet carrier for use in vehicles and, more particularly, to a pet carrier comprising a basket and support means for supporting the basket on a vehicle's passenger seat in a manner which permits pets restrained within the basket to easily view the outer surroundings of the vehicle through the windows.

2. Description of the Related Art

It is well known that when animals, particularly dogs and cats, are transported in a motor vehicle, they become excited and anxious. If, however, animals are able to view the surroundings through the windows of the vehicle, they are usually more relaxed and can better enjoy the ride. Usually, when pets ride in a vehicle, they are left unrestrained. Other times, pets are kept in a cage on the floor or in the rear of the vehicle, such as in the rear cargo area of a sport utility vehicle. In either case, if the pet cannot see out of the windows, they may become increasingly excited or even sick due to visual disorientation.

If small pets, especially small dogs, are left unrestrained in the vehicle, they frequently run about the vehicle interior, jumping up in an attempt to see out of the windows. This presents a danger to the pet, the driver, the vehicle occupants, and other vehicles and pedestrians in the vicinity of the vehicle. The unrestrained pet may be injured from collision with parts of the vehicle interior or other occupants, should the vehicle be caused to stop suddenly, accelerate or turn sharply. Furthermore, the driver may be distracted or physically interfered with, possibly causing a collision or other accident. Unrestrained pets have also been known to jump out of open windows and doors of vehicles, sometimes resulting in injury or death of the animal.

In the past, various pet carriers have been developed in an effort to provide a safe and pleasant means of transporting dogs and cats in motor vehicles, in a manner which allows the animal to see out of the windows of the moving vehicle. Some of these pet carriers include a box or basket which is suspended on the rear of the vehicle seat. In particular, U.S. Pat. No. 3,465,930 discloses a small container which is positioned on the top of the seat back and held in place by straps. U.S. Pat. No. 4,010,880 discloses a basket or hamper which includes two movable hooks to permit the basket to be hung on a vehicle's seat back. On the other hand, U.S. Pat. No. 4,597,359 discloses a platform for pets which is supported on the seat base, permitting a pet to sit or stand at an elevated position relative to the seat base.

While some of the pet carrier devices in the art have been found to be generally effective for their intended purpose, all of them have shortcomings which limit their overall effectiveness and usefulness. In particular, the vehicle pet carriers proposed in the related art all fail to provide for a means for adjusting the angle of a rear support which fits to the seat back of the passenger seat, thereby failing to accommodate for varying angles of the seat back relative to the seat base. Thus, for those pet carriers which are supported on the seat back, it is necessary to position the seat back in a perfectly upright, vertical position so that the pet carrier is supported in its proper, generally horizontal orientation.

The various pet carriers known in the related art also fail to provide adequate means for hand carrying the carrier, with one or more pets inside, once the carrier is removed from the vehicle. Hence, the vehicle pet carriers in the related art are limited to use in a vehicle and cannot be removed to carry a pet when, for instance, shopping, dining, or simply walking to and from the vehicle.

Accordingly, there still exists a need in the related art for a pet carrier adapted for use in a vehicle and including adjustable support means for supporting the carrier on a vehicle's seat back at varying angles, and further wherein the pet carrier can be removed from the vehicle for hand carrying the carrier and one or more pets restrained therein.

SUMMARY OF THE INVENTION

A pet carrier for safely transporting pets in a vehicle includes a basket having a floor and surrounding containment walls and a support assembly for mounting the carrier to a passenger seat of the vehicle so that pets restrained within the basket can easily view the outer surroundings through the vehicle's windows. The support assembly includes a pair of rear arm members movably adjustable to assume a select one of several locked, operable positions with a hooked distal end zone of the arm members resting over the top of the seat back to maintain the basket forward of the seat back, and a removable forward leg support depending below the basket for engagement with the seat base to thereby maintain the basket floor generally horizontal and above the seat base. Collapsible handles permit hand carrying of the carrier and pets therein when the carrier is removed from the vehicle and an adjustable strap in the basket attaches to the pet to restrain the pet within the carrier.

OBJECTS AND ADVANTAGES OF THE INVENTION

It is a primary object of the present invention to provide a pet carrier for transporting pets in a vehicle wherein the carrier includes adjustable support means which accommodates for varying angles of the seat back.

It is a further object of the present invention to provide a pet carrier for use in a vehicle, wherein the carrier includes a collapsible support assembly which allows the carrier to be easily removed and installed in the vehicle.

It is a yet a further object of the present invention to provide a pet carrier which includes collapsible handles to permit hand carrying of the carrier and pets restrained therein, once the carrier is removed from the vehicle.

It is still a further object of the present invention to provide a pet carrier which, when installed to a passenger seat in a vehicle, provides for safe transport of animals in a manner which allows the transported animals to easily and comfortably view the outside surrounding through the vehicle's windows.

These and other objects and advantages of the present invention are more readily apparent with reference to the accompanying drawings and detailed description.

BRIEF DESCRIPTION OF THE DRAWINGS

For a fuller understanding of the nature of the present invention, reference should be made to the following detailed description taken in conjunction with the accompanying drawings in which:

FIG. 2 is a side elevational view of the pet carrier illustrating movement of the support means and handles thereof;

FIG. 3 is an isolated sectional view of the forward leg support means taken along the line 3—3 of FIG. 2;

Like reference numerals refer to like parts throughout the several views of the drawings.

DETAILED DESCRIPTION OF THE PREFERRED EMBODIMENT

Figure 1:
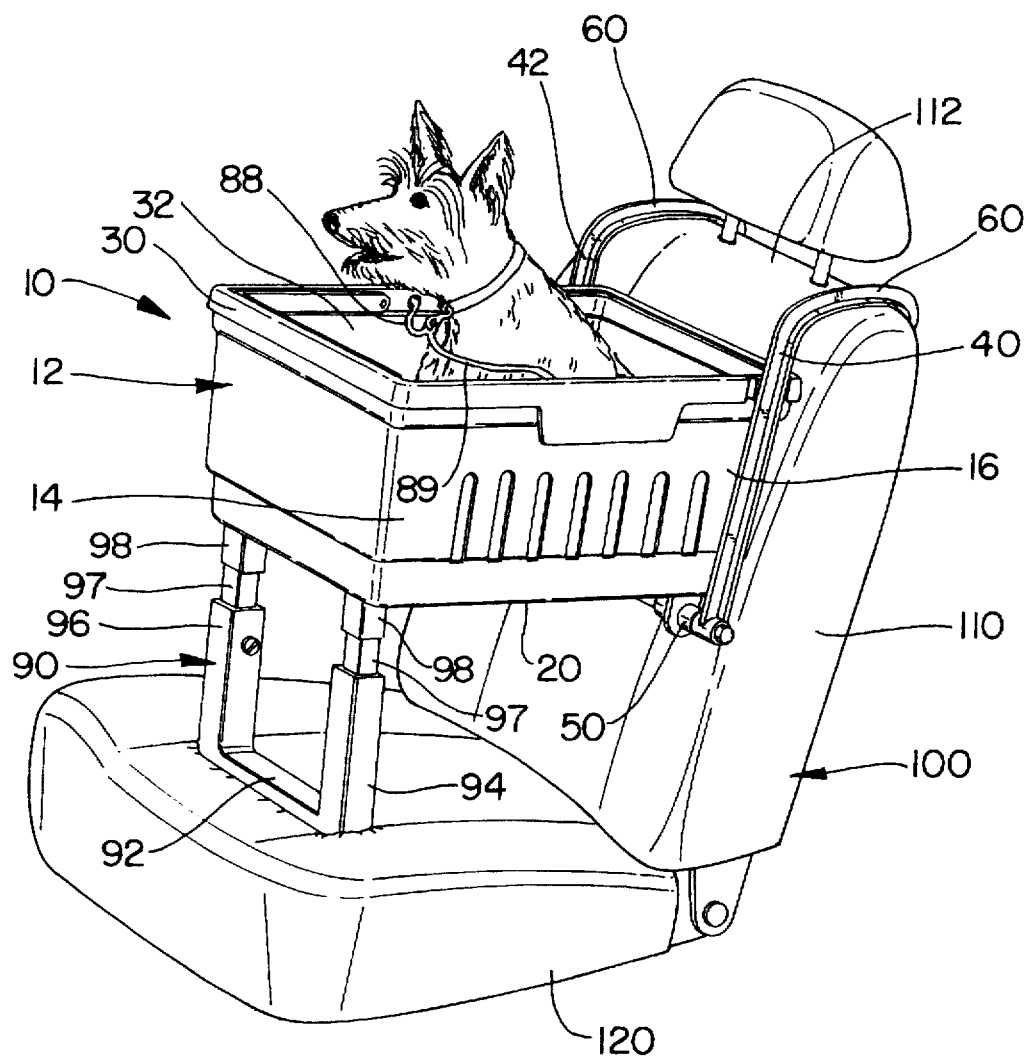
FIG. 1 is a perspective view of the pet carrier of the present invention shown operatively supported on a vehicle's passenger seat with a pet restrained therein.

Referring to the several figures of the drawings, the present invention directed to a pet carrier is shown and generally indicated as 10. The pet carrier 10 is specifically adapted for use in a vehicle to carry one or more pets, such as small dogs or cats, safely and securely and in a manner which enables the pets to view the outer surroundings of the vehicle through the vehicle's windows.

The pet carrier 10 includes a basket 12 having a forward zone 14 and a rearward zone 16. The basket is primarily defined by a floor 20 and upwardly extending walls, including a forward end wall 22, a rear end wall 24, and opposite side walls 26, 28. The walls extend upwardly from the floor 20 to a top peripheral rim 30 surrounding an open top of a pet containment area 32 within the basket 12.

The pet carrier 10 is further provided with a support assembly for removably supporting the basket 12 on a passenger seat 100 of a vehicle. More specifically, the support assembly maintains the basket 12 in secured position on the passenger seat 100 so that the basket 12 is positioned forward of the seat back 110 with the floor 20 of the basket spaced above the seat base 120 and generally perpendicular to the seat back 110 so that the floor 20 remains horizontal.

Figure 6:
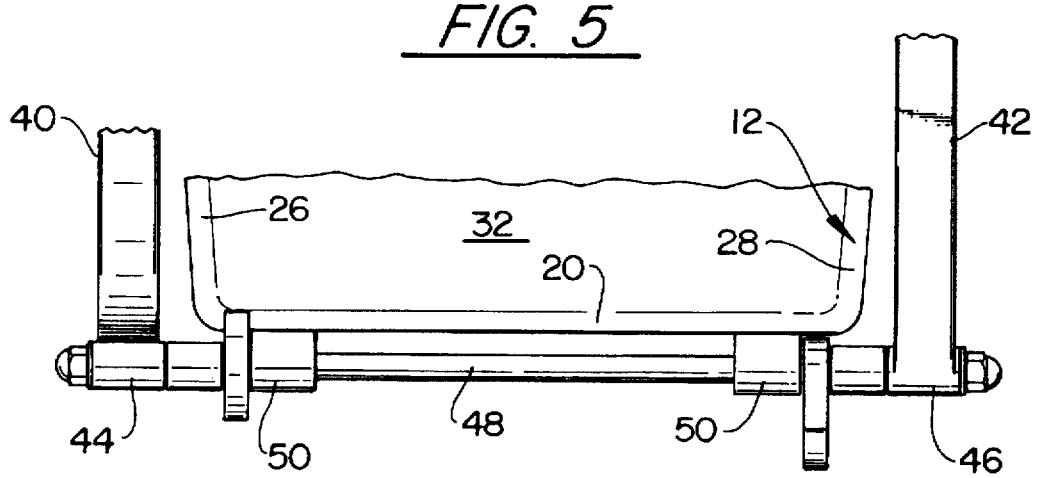
FIG. 6 is an isolated, lower rear elevation of the rear arm support members, wherein one of the arm members is in one of the adjusted, operative positions, as seen in FIG. 2, and the other arm member is in a stowed position, as seen in FIG. 4.

The support assembly includes a pair of arm members 40, 42 rotatably fitted at lower proximal ends 44, 46, respectively, to opposite ends of a transverse axle 48. As best seen in FIGS. 1 and 6, the transverse axle 48 is mounted to a bottom of the basket 12, below the floor 20, on brackets or sleeves 50 through which the transverse axle 48 extends. Each arm member 40, 42 includes a hooked distal end zone 60 including an upper arched segment 62 and a downwardly extending distal end segment 64. To support the basket 12 on the seat back 10, the arms 40, 42 are moved to one of a plurality of locked, adjusted positions (as shown in FIG. 2) so that the hooked distal end zone 60 of each arm member rests over the top of the seat back 110, as seen in FIG. 1. More specifically, the upper arched segment 62 engages the top 112 of the seat back and the downwardly extending distal end segment 64 extends partially down and engages the rearward facing side of the seat back 110.

As mentioned above, the arm members 40, 42 are each movable to assume one of a plurality of selected, adjusted positions. Once locked into the selected, adjusted position, the arm members 40, 42 are operably positioned for mounting on the seat back 110. The particular selected adjusted position of each arm member 40, 42 is dependent on the angle of the seat back 110. More specifically, it is desirable to maintain the floor 20 of the basket generally level, on a horizontal plane, so that pets restrained within the basket are able to stand, sit or lie down comfortably without sliding or being urged towards the rearward zone 16 of the basket.

Referring to FIG. 2, the various operable positions of the arm members 40, 42 are illustrated. If the seat back 110 of the vehicle is in a generally upright, vertical position, the arm members 40, 42 should be locked into position A. If, however, the seat back 110 is partially reclined, then the arm members should be locked into position B. A further reclined angle of the seat back 110 requires the arm members to be moved and locked into position C, thereby maintaining the floor 20 level.

In order to maintain the arm members 40, 42 in each of the adjusted, operable positions, lock means 70 are provided. In a preferred embodiment, the lock means 70 include a plurality of notches 72 formed in the top peripheral rim 30 at spaced intervals along the opposite sides at the rearward zone 16. The lock means 70 are further defined by a generally T-shaped cross-sectional configuration of the arm members 40, 42 and particularly an inboard extending portion 74 which is sized and configured for nesting receipt within the notches 72. It is noted that the arm members 40, 42 are rigid and yet they are flexible to a degree which permits the arm members to be pulled outwardly away from the sides of the basket 12 so that the inboard extending members 74 clear the notches 72. In a relaxed state, the arm members are urged inwardly towards the sides 26, 28 of the basket 12 so that once properly positioned in one of the selected positions A, B, C, the inboard extending members 74 of the arm members 40, 42 fall into the respective notch 72 to maintain the arm member in that position and to prevent forward or reverse movement of the arm members relative to the basket.

Figure 4:
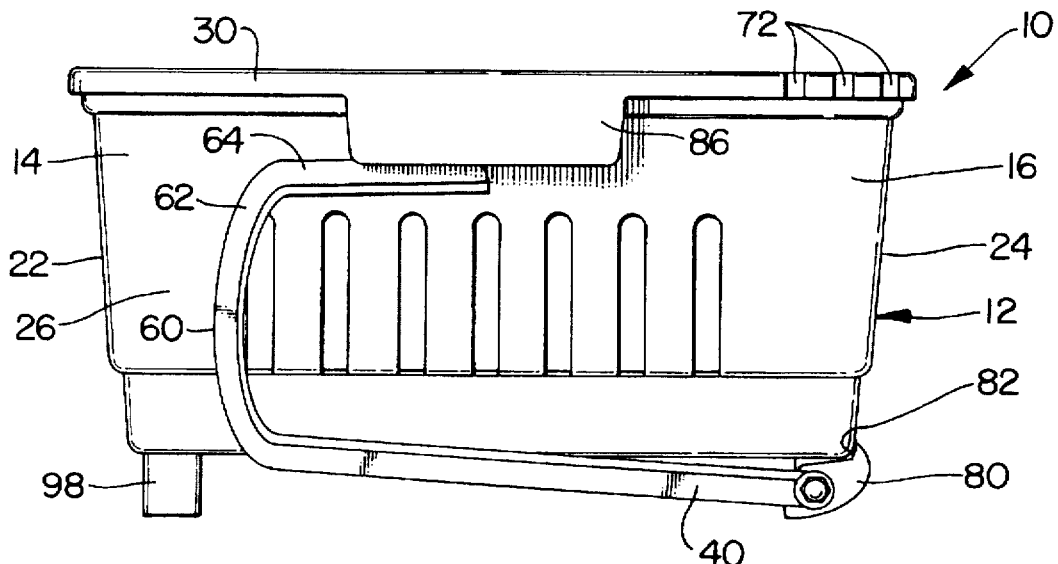
FIG. 4 is a side elevational view of the pet carrier shown in a collapsed position when removed from a vehicle.
Figure 5:
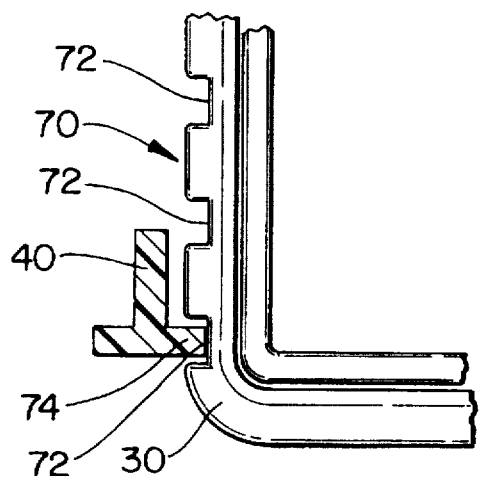
FIG. 5 is an isolated view, in partial section, illustrating locking means for locking a pair of rear arm support members in one of a plurality of adjusted, operative positions in accordance with the preferred embodiment of the present invention.

The arm members 40, 42 are further movable to a stowed position, as seen in FIG. 4, so that the basket may be easily carried when removed from the vehicle. As seen in FIG. 4, when the arm members 40, 42 are in the stowed position, they remain positioned along the opposite sides 26, 28 of the basket 12. Cam members 80 are fitted to the lower ends 44, 46 of the respective arm members 40, 42. When each of the arm members is rotated forwardly and downwardly to the stowed position, a protruding stop finger 82 of the respective cam member 80 swings upwardly and engages a lower end of the rear wall 24 of the basket, preventing further downward movement of the respective arm member. A rigid flap 86 extends downwardly from the peripheral rim 30 on each side of the basket, in spaced relation to the respective side walls 26, 28. When in the stowed position, the downwardly extending distal end segment 64 of each arm member 40, 42 is positioned between the flap 86 and the respective side wall 26, 28, thereby helping to retain the arm members 40, 42 in the stowed position. Upward movement of the arm members 40, 42 from the stowed position results in an outboard extending portion 75 of the arm members engaging a lower edge of the respective flaps 86, thereby captivating the arm members in the stowed position. To move the arm members from the stowed position to one of the selected, operable positions, the distal end segment 64 is pushed downwardly so that it clears the lower edge of the flap 86. Thereafter, the hooked end zone 60 is pulled away from the side of the basket so that upon upward, rearward rotation of the arm members to one of the operable positions, the hooked distal end zone 60 will clear the peripheral rim 30 and flap 86.

The support assembly further includes a forward leg support structure which rests on the upper surface of the seat base 120, providing added support below the forward zone 14 of the basket 12. The forward leg structure includes a generally U-shaped leg member 90 having a base 92 which rests on the top surface of the seat base 120, and opposite, upwardly extending parallel legs 94, 96. An extension segment 97 is removably fitted at a top end within sockets 98 on the bottom of the basket, generally at the corners of the forward zone 14. A lower portion of each of the extension segments 97 is sized and configured for sliding receipt within a respective one of the legs 94, 96. The distance between the base 92 of the forward leg assembly and the bottom of the basket 12 can be adjusted by slidably moving the legs 94, 96 along the lower portion of the extension segments 97. The distance between the base 92 and basket bottom, defining a length of the forward leg assembly, is adjusted until the base 92 engages the top surface of the seat base 120 while the basket is maintained in a generally horizontal orientation as seen in FIG. 1. A set screw or like means 99 is provided to fix the legs 94, 96 in adjusted position on the extension segments 97.

Handles for carrying the basket 12, once removed from the vehicle, are provided and include a pair of generally U-shaped handle members 78 each pivotally mounted at opposite lower ends to the inner peripheral rim 30 so that the handles 78 are movable (as indicated by the arrows in FIG. 2) from a raised position for grasping to a lowered, stowed position along the inner sides of the peripheral rim 30, as seen in FIG. 1.

To restrain the pet within the containment area 32, a leash 88 is provided. The leash 88 includes a leash cord or segment which is fitted at opposite ends to the upper peripheral rim 30 and is adjustable in length. A clip or other means is provided on the leash cord to secure the leash to a collar on the pet.

It should be noted that when the basket 12 is removed from the vehicle, the forward support assembly is removed, including the leg member 90 and extension segments 97. Further, the arms 40, 42 are lowered to the stowed position, as seen in FIG. 4. In this mode, the basket 12 can be placed on a table top, counter, or other level surface so that the cam members 80 and sockets 98 support the basket in a generally horizontal, level orientation.

While the present invention has been shown and described in what is considered to be a preferred and practical embodiment thereof, it is recognized that departures may be made which, therefore, should not be limited except as set forth in the following claims and within the doctrine of equivalents.

Now that the invention has been described,

What is claimed is:

1. A pet carrier adapted for use in a vehicle having windows and at least one passenger seat with a seat base and a seat back, the seat back having a forward facing side, a top end, and a rearward facing side;

said pet carrier comprising:

a basket having a forward zone and a rearward zone and including a floor and upwardly extending walls surrounding a pet containment area, said walls including a forward end wall, a rear end wall, and opposite side walls terminating at a top peripheral rim surrounding an open top of said pet containment area;

support means for removably supporting said basket on the passenger seat, forward of the seat back, so that said floor is supported in spaced relation above the seat base, said support means including:

a pair of arm members movably mounted to said rearward zone of said basket and each including a hooked distal end zone, said arm members being movably adjustable between a plurality of operative positions defined by said arm members extending generally upward relative to said floor so that said hooked distal end zone of each of said arm members rests over said top end and partially down said rearward facing side of said seat back;

means for adjusting said pair of arm members between said plurality of operative positions and a stowed position defined by said arm members extending below said peripheral rim towards said forward zone, adjacent said opposite side walls;

means for locking said pair of arm members in each of said plurality of operative positions and said stowed position;

forward leg means removably attachable to said forward zone and depending downwardly below said floor for supporting engagement with said seat base;

handle means for carrying said basket with one or more pets in said pet containment area when said basket is removed from the vehicle; and pet restraining means fitted to said pet carrier and removably attachable to one or more pets carried in said pet containment area for restraining the one or more pets within said pet containment area.

2. A pet carrier as recited in claim 1 wherein said means for adjusting said pair of arm members includes:

a transverse axle mounted to a bottom of said basket at said rearward zone; and lower proximal ends of each of said arm members rotatably fitted to opposite ends of said transverse axle to permit rotating movement of each of said arm members between each of said plurality of operative positions and said stowed position.

3. A pet carrier as recited in claim 2 wherein said means for locking said pair of arm members includes a cam member fitted to each of said lower proximal ends of said arm members, each of said cam members including a stop finger structured and disposed to engage said basket when said arm members reach said stowed position, thereby preventing rotational movement of said arm members beyond said stowed position.

4. A pet carrier as recited in claim 3 wherein said means for locking said pair of arm members further includes a plurality of notches formed at spaced intervals along said peripheral rim at said rearward zone of said basket, each of said notches being structured for nesting receipt of a respective one of said arm members therein to define one of said plurality of operative positions.

5. A pet carrier as recited in claim 1 wherein said handle means includes a pair of generally U-shaped handle members each having opposite distal ends pivotally fitted to an inward facing side of a respective one of said opposite side walls, each of said handles being movable between a raised position for carrying said basket and a collapsed, stowed position in parallel relation to said peripheral rim.

6. A pet carrier as recited in claim 1 wherein said forward leg means includes a U-shaped leg member having a base structured and disposed to rest on the seat base and a pair of upwardly extending parallel legs.

7. A pet carrier as recited in claim 6 wherein said forward leg means further includes a pair of extension segments removably attachable to a bottom of said basket and each including a lower portion sized and configured for sliding receipt within a respective one of said parallel legs of said U-shaped leg member, and means for fixing said parallel legs in adjusted position on each of said extension segments to permit adjusting a length of said forward leg means measured from said base of said U-shaped leg member to said floor of said basket.

* * * * *